United States Patent
Vuong et al.

(10) Patent No.: US 9,460,157 B2
(45) Date of Patent: *Oct. 4, 2016

(54) RANKING SEARCH RESULTS BASED ON COLOR

(71) Applicant: Wal-Mart Stores, Inc., Bentonville, AR (US)

(72) Inventors: Ba-Quy Vuong, Foster City, CA (US); Abhishek Gattani, Sunnyvale, CA (US); Namrata PramodKumar Tholiya, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,765

(22) Filed: Dec. 28, 2012

(65) Prior Publication Data

US 2014/0188853 A1     Jul. 3, 2014

(51) Int. Cl.
*G06F 17/30*     (2006.01)
*G06Q 30/06*     (2012.01)

(52) U.S. Cl.
CPC ..... *G06F 17/3053* (2013.01); *G06F 17/30991* (2013.01); *G06Q 30/0601* (2013.01)

(58) Field of Classification Search
CPC ...................... G06Q 30/0601; G06Q 10/0637; G06Q 30/0621; G06Q 10/087; G06Q 30/02; G06Q 30/0246; G06Q 50/22; G06Q 10/06; G06Q 10/063; G06Q 10/0635; G06Q 10/107; G06Q 20/00; G06Q 30/00; G06Q 30/0222
USPC ....... 715/738, 753, 733, 226, 234, 253, 719, 715/744, 746, 747; 707/769, E17.014, 722, 707/E17.03, E17.044, 706, 708, 710, 731, 707/732, 737, 753, 812; 709/203, 206, 213; 705/14.43, 12, 14.23, 14.49, 14.53, 2, 705/26.1, 26.5, 26.63, 30, 7.11, 7.36
See application file for complete search history.

(56) References Cited

U.S. PATENT DOCUMENTS

| | | | |
|---|---|---|---|
| 5,751,450 A | 5/1998 | Robinson | |
| 5,949,904 A | 9/1999 | Delp | |
| 7,519,548 B2 | 4/2009 | Hanechak et al. | |
| 7,536,059 B2 | 5/2009 | Xu et al. | |
| 7,657,100 B2 | 2/2010 | Gokturk | |
| 8,249,398 B2 | 8/2012 | Lee | |
| 8,406,573 B2 | 3/2013 | Wang | |
| 8,576,241 B1 | 11/2013 | Kanter | |
| 8,577,134 B2 | 11/2013 | Tirumalareddy | |

(Continued)

OTHER PUBLICATIONS

Xiao et al. ("Extracting Structured Information from User Queries with Semi-Supervised Conditional Random Fields", pp. 572-579, ACM New York, NY USA © 2009; ISBN:978-1-60558-483-6).*

*Primary Examiner* — Jay Morrison
*Assistant Examiner* — Ken Hoang
(74) *Attorney, Agent, or Firm* — Bryan Cave LLP

(57) ABSTRACT

Example systems and methods that rank search results based on color are described. In one implementation, a method receives a product search query from a user and identifies a reference to a color in the product search query. The product search query is executed to identify multiple products. The method further identifies references to the color in a title or a description of each of the multiple products. A ranking of the multiple products is created by increasing the ranking of products that include a reference to the color in the title or the description.

15 Claims, 8 Drawing Sheets

(56) References Cited

U.S. PATENT DOCUMENTS

| | | |
|---|---|---|
| 8,611,695 B1 | 12/2013 | Han |
| 8,655,648 B2 | 2/2014 | Kulkarni et al. |
| 8,699,826 B2 | 4/2014 | Remedios |
| 8,712,156 B2 | 4/2014 | Bronstein |
| 8,891,860 B2 * | 11/2014 | Masuko .............. G06F 17/30 382/162 |
| 2003/0217052 A1 * | 11/2003 | Rubenczyk et al. .......... 707/3 |
| 2003/0231185 A1 | 12/2003 | Kupersmit |
| 2004/0101156 A1 | 5/2004 | Kacker |
| 2006/0047580 A1 | 3/2006 | Saha |
| 2007/0018906 A1 | 1/2007 | Visnovsky et al. |
| 2007/0223811 A1 | 9/2007 | Kudo |
| 2008/0046410 A1 * | 2/2008 | Lieb ............................ 707/3 |
| 2008/0046424 A1 * | 2/2008 | Horton ......................... 707/6 |
| 2008/0082518 A1 | 4/2008 | Loftesness |
| 2008/0089615 A1 | 4/2008 | Shiiyama |
| 2008/0118151 A1 | 5/2008 | Bouguet |
| 2008/0152225 A1 | 6/2008 | Iwamoto |
| 2008/0154608 A1 | 6/2008 | Evermann et al. |
| 2008/0154747 A1 | 6/2008 | Tarbell |
| 2008/0162469 A1 * | 7/2008 | Terayoko .......... G06F 17/30256 |
| 2010/0049707 A1 | 2/2010 | Faria et al. |
| 2010/0158412 A1 | 6/2010 | Wang et al. |
| 2011/0191334 A1 | 8/2011 | Hua |
| 2011/0235902 A1 | 9/2011 | Chittar et al. |
| 2012/0185472 A1 * | 7/2012 | Ahmed ............. G06F 17/30867 707/728 |
| 2012/0296926 A1 | 11/2012 | Kalin et al. |
| 2013/0022264 A1 | 1/2013 | Atsmon |
| 2013/0080426 A1 | 3/2013 | Chen |

* cited by examiner

RANKING SEARCH RESULTS BASED ON COLOR

RELATED U.S. APPLICATIONS

This application is related to U.S. application Ser. No. 13/730,772, filed Dec. 28, 2012 and U.S. application Ser. No. 13/730,781, filed Dec. 28, 2012. The applications are incorporated herein by reference for all purposes.

TECHNICAL FIELD

The present disclosure relates to systems and methods that rank search results based on a reference to a color in a search query.

BACKGROUND

Purchasers of products or services may perform various search queries to locate a desired product or service. In some situations, the purchaser may include one or more characteristics of the desired product or service, such as color, size, product type, and the like. However, many existing search engines do not properly select products or services that have the desired characteristics. Instead, at least a portion of the search results displayed to the purchaser are not what the purchaser desired. Further, many existing search engines do not properly rank the search results based on the desired characteristics provided by the purchaser.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
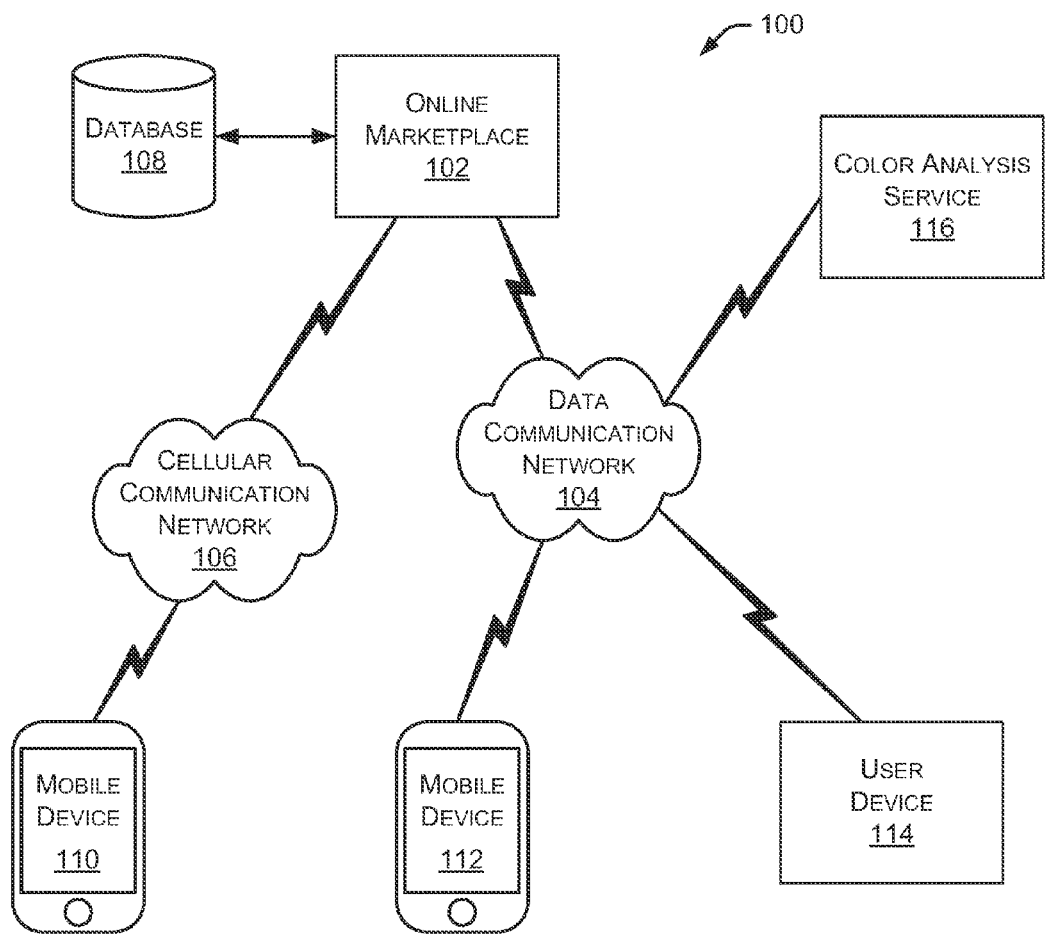
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein generate search results based on references to one or more colors in a search query submitted by a user. As described herein, a product search query is received from a user. The product search query is analyzed to identify a reference to a color in the product search query. The search query is executed to identify multiple products arranged in an initial ranking order. A title and/or description of each of the multiple products are analyzed to identify references to color. A modified ranking of the multiple products is created by increasing the raking of products that include a reference to the color in the title and/or description.

FIG. 1 is a block diagram depicting an environment 100 within which an example embodiment may be implemented. Environment 100 includes an online marketplace 102 coupled to a data communication network 104, such as the Internet, and a cellular communication network 106. Online marketplace 102 includes any type of Web site or online service that is accessible by one or more users to purchase any type of product or service. Online marketplace 102 may be implemented using one or more systems and/or services, such as web-based servers and the like. A particular online marketplace 102 may offer products or services associated with a single entity (e.g., a single merchant) or from multiple different entities. In some embodiments, online marketplace 102 is implemented by the entity (e.g., merchant) offering the products or services. Online marketplace 102 may also be referred to as an "ecommerce site," an "ecommerce marketplace," or an "online ecommerce marketplace." Online marketplace 102 is also coupled to a database 108, which stores, for example, information associated with the products and services available through online marketplace 102. In some embodiments, database 108 stores data utilized by one or more servers to implement online marketplace 102.

Online marketplace 102 communicates with various systems, services, and devices through data communication network 104. Data communication network 104 may utilize any communication protocol and any type of communication medium. In some embodiments, data communication network 104 is a combination of two or more networks coupled to one another. Online marketplace 102 also communicates with various systems and devices, such as mobile devices, through cellular communication network 106, which may utilize any communication protocol and any type of communication medium. In some embodiments, cellular communication network 106 is a combination of two or more networks coupled to one another.

As shown in environment 100, a mobile device 110 communicates with online marketplace 102 through cellular communication network 106. Although a single mobile device 110 is shown in FIG. 1, particular embodiments may include any number of mobile devices (and non-mobile devices) communicating with online marketplace 102 through cellular communication network 106. A second mobile device 112 communicates with online marketplace 102 through data communication network 104. Although one mobile device 112 is shown communicating through data communication network 104, particular embodiments may include any number of mobile devices communicating with online marketplace 102 through data communication network 104. Mobile devices 110 and 112 include any type of device capable of communicating with online marketplace 102 through cellular communication network 106 or data communication network 104, such as a cellular phone, a smart phone, a tablet computer, a laptop computer, a desktop computer, a portable entertainment device, a portable gaming device, and the like.

Additionally, a user device 114 communicates with online marketplace 102 through data communication network 104. User device 114 includes any type of device capable of communicating with online marketplace 102 through data communication network 104, such as a smart phone, a tablet computer, a laptop computer, a desktop computer, a portable entertainment device, a portable gaming device, a game console, a set top box, and the like.

An optional color analysis service 116 is also coupled to data communication network 104. Color analysis service 116 performs various functions related to the identification and analysis of colors in a search query, as discussed herein. For example, color analysis service 116 may analyze a particular color referenced in a search query to identify similar colors, such as identifying the color "pink" as being similar to the color "red." Although a single color analysis service 116 is shown in FIG. 1, particular environments 100 may include any number of different color analysis services 116 coupled to data communication network 104. In alternate embodiments, one or more color analysis services are coupled directly to online marketplace 102. In further embodiments, one or more color analysis services or algorithms are contained within online marketplace 102.

Figure 2:
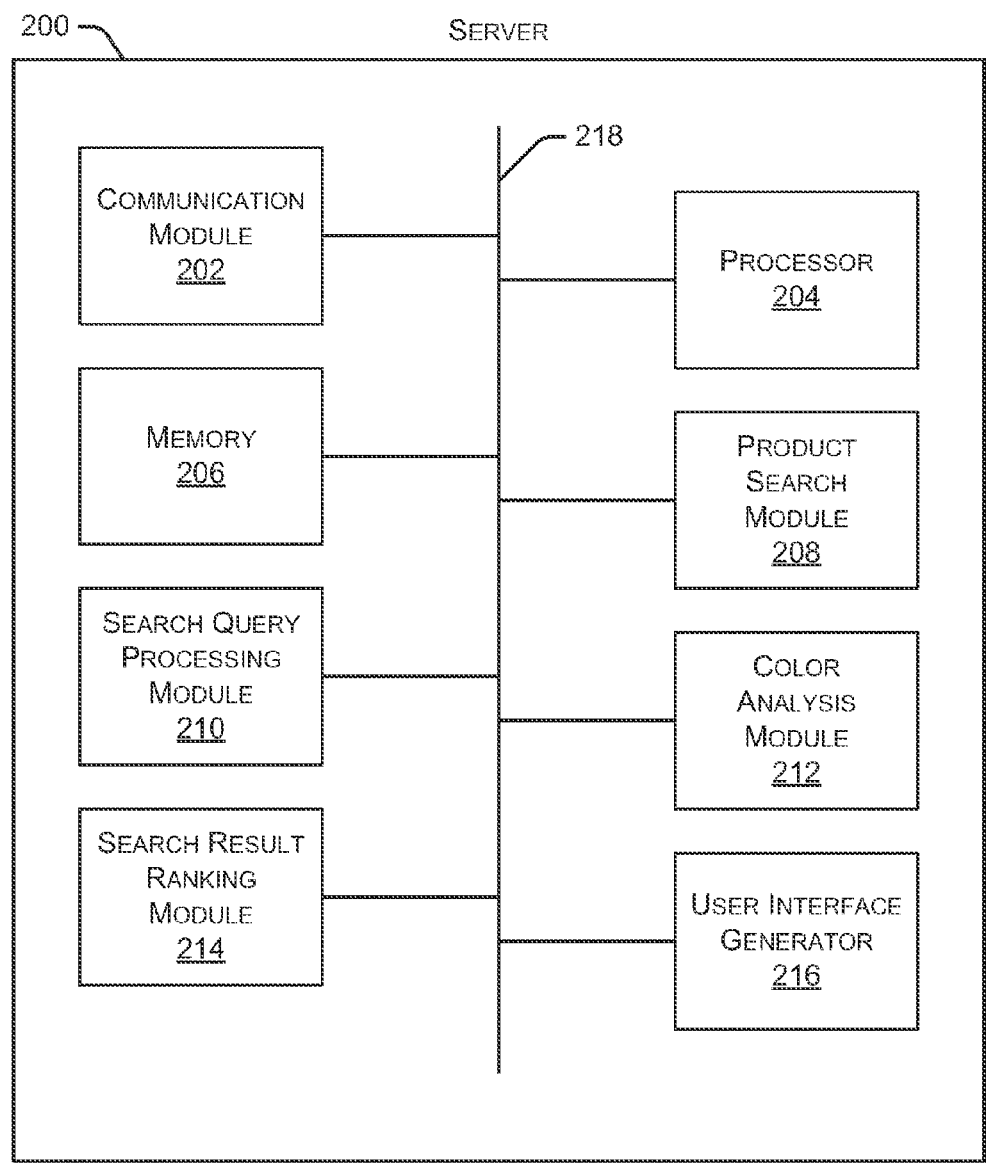
FIG. 2 is a block diagram depicting an embodiment of a server associated with an online marketplace.

FIG. 2 is a block diagram depicting an embodiment of a server 200 associated with online marketplace 102. Server 200 performs various functions related to the operation of online marketplace 102, as discussed herein. In some embodiments, online marketplace 102 includes multiple servers 200 that cooperatively implement the functions described herein. Server 200 includes a communication module 202, a processor 204, and a memory 206. Communication module 202 allows server 200 to communicate with other systems, such as communication networks, other servers, mobile devices 110 and 112, user device 114, color analysis service 116, and the like. Processor 204 executes various instructions to implement the functionality provided by server 200. Memory 206 stores these instructions as well as other data used by processor 204 and other modules contained in server 200.

Server 200 also includes product search module 208, which handles the receiving and processing of product search queries (or product search requests) from multiple users. In some embodiments, product search module 208 supports various product search techniques, such as a keyword search, a category search, a department search, a brand search, and the like. In particular implementations, users interact with server 200 through a user interface to search for desired products or services. A search query processing module 210 performs, for example, various operations associated with the processing of product search queries received from multiple users. As discussed herein, search query processing module 210 may execute a search query to identify potential products or services of interest to the user. In some embodiments, execution of the search query identifies multiple products that are initially ranked based on a likelihood of interest to the user providing the search query (e.g., products with a highest likelihood of interest to the user are presented at the top of the ranking).

A color analysis module 212 performs various functions associated with identifying references to one or more colors in a search query. As discussed herein, any reference to a color in a search query may affect the ranking of the search results presented to the user. Thus, color analysis module 212 may communicate with search query processing module 210 and a search result ranking module 214 to assist with the creation of appropriately ranked search results. In some embodiments, search result ranking module 214 may determine an initial ranking based on an initial execution of the search query submitted by the user. As discussed herein, search results ranking module 214 may then modify the initial ranking of the search results based on references to color in the search query and other factors.

Server 200 further includes a user interface generator 216 that creates data to present various user interfaces to a user of mobile device 110, 112, or user device 114. Example user interfaces include search query input interfaces, product or service listings based on the results of executing the search query, and the like. A data communication bus 218 allows the various systems and components of server 200 to communicate with one another.

Figure 3:
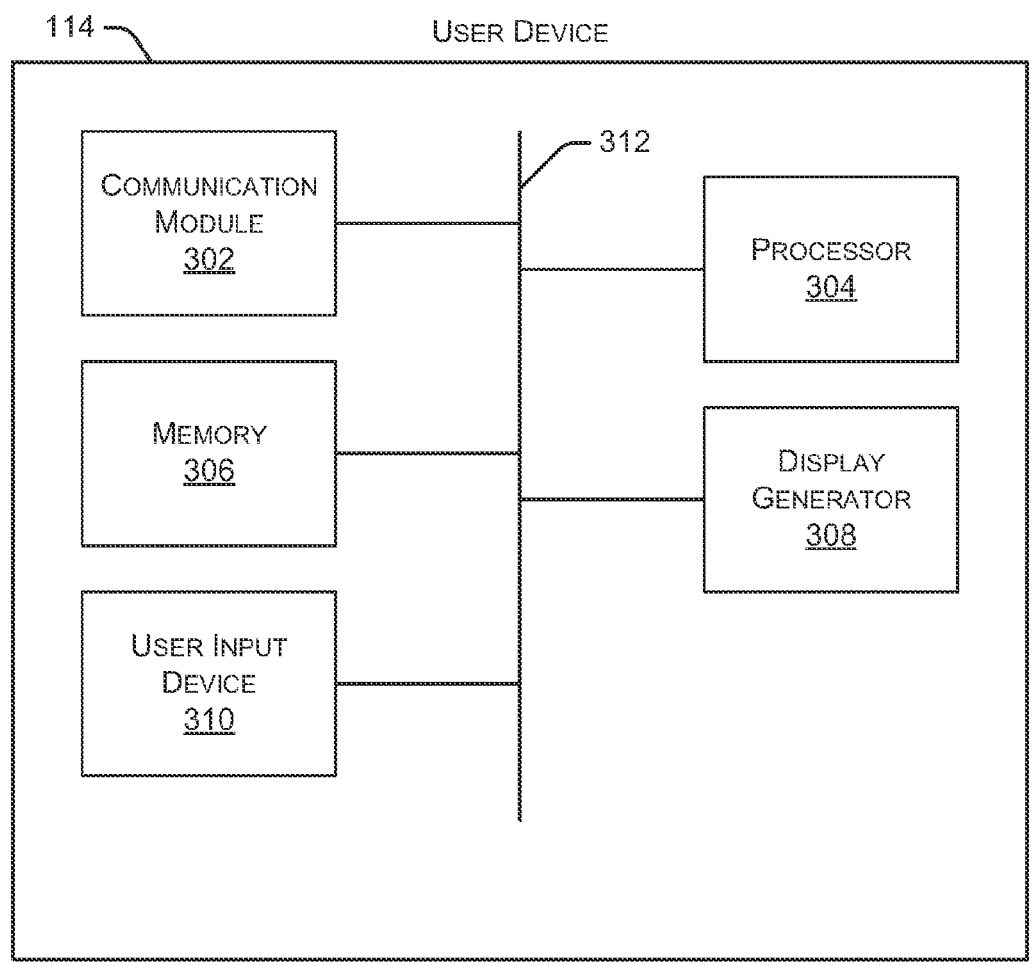
FIG. 3 is a block diagram depicting an embodiment of a user device.

FIG. 3 is a block diagram depicting an embodiment of user device 114. User device 114 is operated by a user to interact with online marketplace 102 to search for products or services, obtain information about various products or services, place orders, and the like. User device 114 includes a communication module 302, a processor 304, and a memory 306. Communication module 302 allows user device 114 to communicate with other systems, such as communication networks, other user devices, online marketplace 102, and the like. Processor 304 executes various instructions to implement the functionality described herein with respect to user device 114. Memory 306 stores these instructions as well as other data used by processor 304 and other modules contained in user device 114.

User device 114 also includes a display generator 308, which generates various signals that enable a display device to present information to a user of the device. In some embodiments, display generator 308 generates various signals that present a user interface to the user of user device 114. In particular implementations, display generator 308 includes, or is coupled to, a display device to present information to the user of the device. This user interface allows a user to, for example, submit a product search query to online marketplace 102. A user input device 310 allows a user to interact with user device 114. Example user input devices 310 include pointing devices, buttons, switches, touch-sensitive portions of a touch-sensitive display device, and the like. A data communication bus 312 allows the various systems and components of user device 114 to communicate with one another. In some embodiments, systems and components similar to those discussed above with respect to user device 114 are included in mobile devices 110 and 112.

Figure 4A:
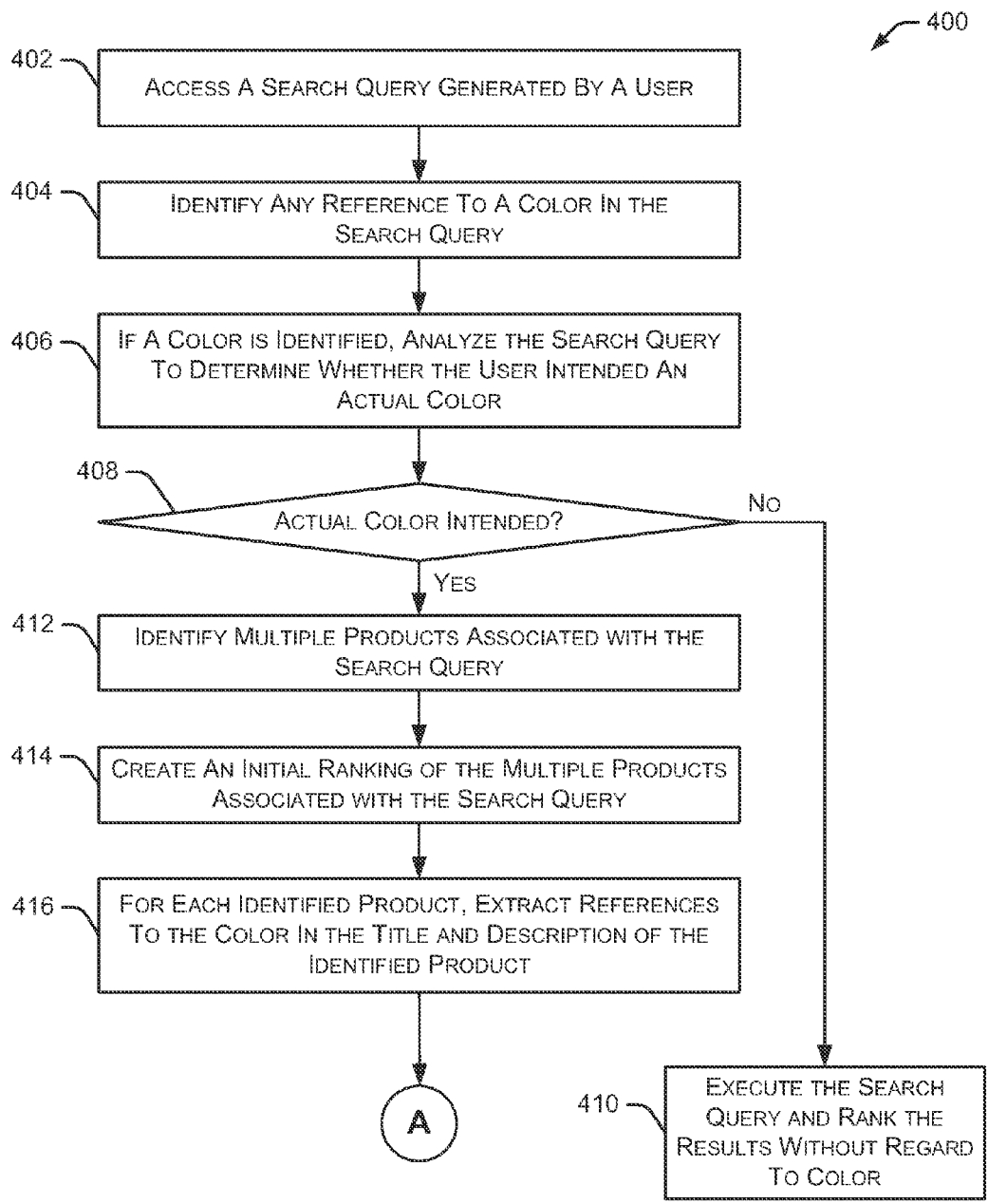
FIGS. 4A and 4B represent a flow diagram depicting an embodiment of a method for ranking search results based on color.
Figure 4B:
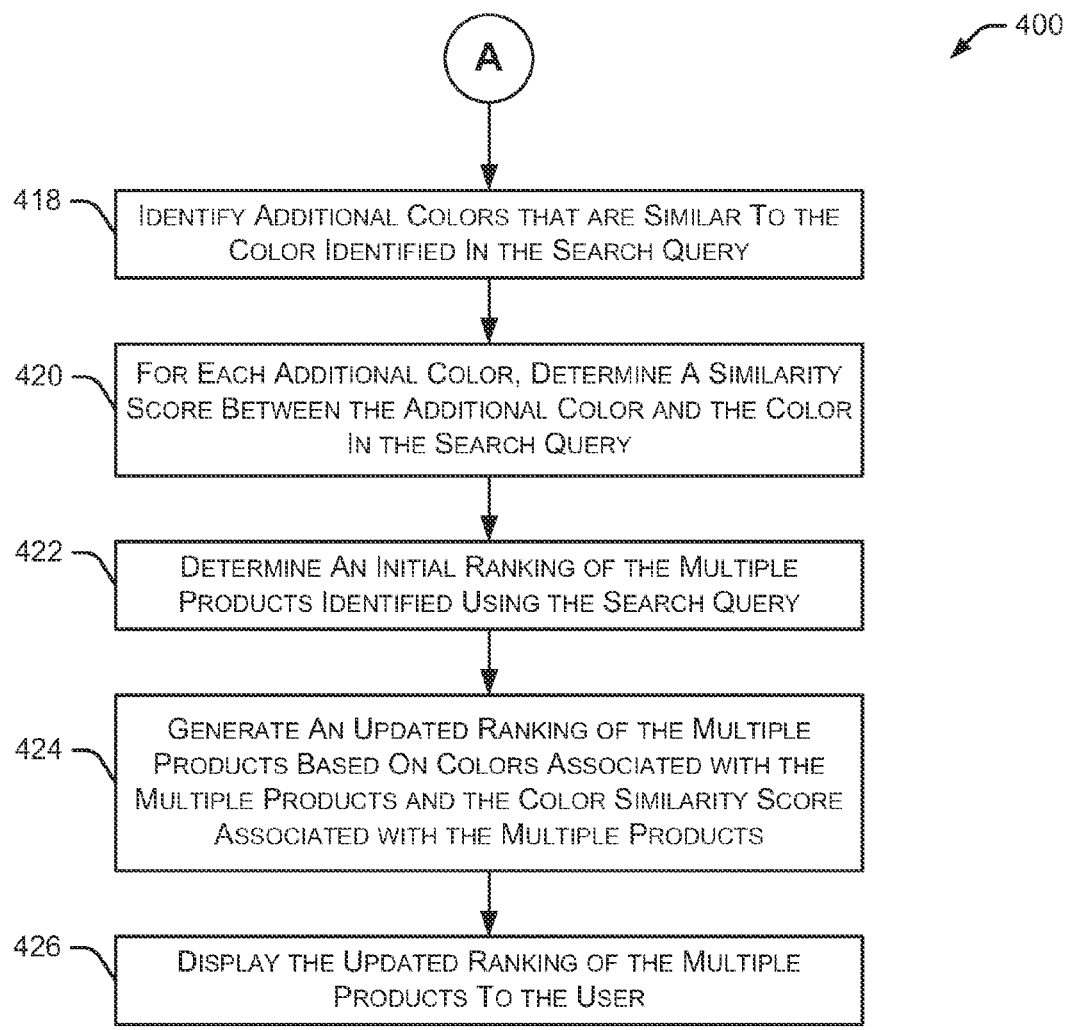

FIGS. 4A and 4B represent a flow diagram depicting an embodiment of a method 400 for ranking search results based on color. The example of method 400 describes the identification of multiple products based on a user's search query. In alternate embodiments, similar procedures may be utilized to identify multiple services or other items based on the search query. Further, the method 400 can be applied to any type of search query (e.g., keyword search, category search, and department search) related to any number of merchants and online marketplaces.

Initially, the method 400 accesses a search query generated by a user at 402. As mentioned above, method 400 may be applied to any type of search query (or combination of multiple types of search queries). For this example, the search query includes at least one keyword entered by the user. The search query may be accessed from another system or may be received directly from the user. The method 400 analyzes the search query to identify any references to a color in the search query at 404. For example, a search query "brown leather jacket" includes a reference to the color "brown," whereas a search query "small leather jacket" does not include any reference to color. Some search queries may contain references to multiple colors, such as "red or pink purse." In some embodiments, each word or term in a search query is compared against a database (or other data listing) of known color terms to identify references to a color in the search query.

If a color is identified in the search query, the method 400 analyzes the search query to determine whether the user intended an actual color in the search query at 406. In some situations, a user may include a term in a search query that matches a known color term, but the user did not intend the term to identify an actual color. For example, a search query for "Red Sox shirt" is referring to the baseball team "Red Sox", not the color red. In this example, the user did not intend an actual color, so the term "red" is not considered in modifying the rankings of the search results. Referring to FIG. 4A, if an actual color is not intended at 408, the method 400 executes the search query and ranks the results without regard to color at 410. Various techniques are available to determine whether a user intended an actual color in a search query. In some embodiments, the terms in the search query are compared to a listing of known phrases that include a color term, but do not intend an actual color. Examples include "Red Sox," "White Sox," and "white water rapids." In other embodiments, a user's intent is determined by comparing cosine similarity between vectors, as discussed below with reference to the example of FIG. 5.

However, if an actual color is intended at 408, the method 400 identifies multiple products associated with the search query at 412 and creates an initial ranking of the multiple products associated with the search query at 414. A color associated with a particular product is determined, for example, based on a title of the product, a description of the product, a color parameter associated with the product, and the like. For each identified product, the method 400 extracts references to the color in the title and description of the identified product at 416.

Referring to FIG. 4B, the method 400 continues by identifying additional colors that are similar to the color identified in the search query at 418. For each additional color that is similar to the color term in the search query, the method 400 determines a color similarity score between the additional color and the color term in the search query at 420. Additional details regarding the calculation of a color similarity score are discussed below with respect to FIG. 6.

The method 400 continues by determining an initial ranking of the multiple products identified using the search query at 422. An updated ranking of the multiple products is generated at 424 based on colors associated with the multiple products and the color similarity score associated with the multiple products. For example, consider a situation where two products initially have a similar ranking based on a search query that includes a color term. If one of the products has a color identical to the color term in the search query and the other product has a different color (or dissimilar color), the product with the identical color will be ranked ahead of the other product. Additionally, if both products have colors that are similar to the color term in the search query, the product with the highest color similarity will be ranked ahead of the other product. The method 400 concludes by displaying the updated ranking of the multiple products to the user at 426. In alternate embodiments, the method 400 generates data that is used by another device or system to present the updated ranking of the multiple products to the user. In some embodiments, a score is assigned to each of the multiple products and the ranking of the multiple products is performed based on the assigned score. In a particular implementation, the BM25F ranking function is used to rank the multiple products.

In alternate embodiments, the method 400 is performed without identifying or analyzing additional colors that are similar to the color in the identified search query. In these alternate embodiments, the method 400 does not consider color similarity when ranking the search results. Instead, the method 400 considers exact color matches between colors identified in the user search query and colors associated with the multiple products associated with the search query when ranking the multiple products.

As noted above, a color associated with a particular product may be determined based on a title of the product, a description of a product, a color parameter associated with the product, and the like. In some embodiments, products available in an online marketplace are periodically analyzed to identify color attributes associated with the products. For example, if a particular product does not have a color associated with a "color field" describing the product, a procedure analyzes all data associated with the product to determine one or more colors associated with the product. For example, the title, description, and features of a product are analyzed to identify actual colors associated with the product. If one or more colors are identified, those colors are added to a "color field" related to that product. In some embodiments, the title, description, and features of a product are analyzed using the systems and methods described herein to identify actual colors associated with the product.

Figure 5:
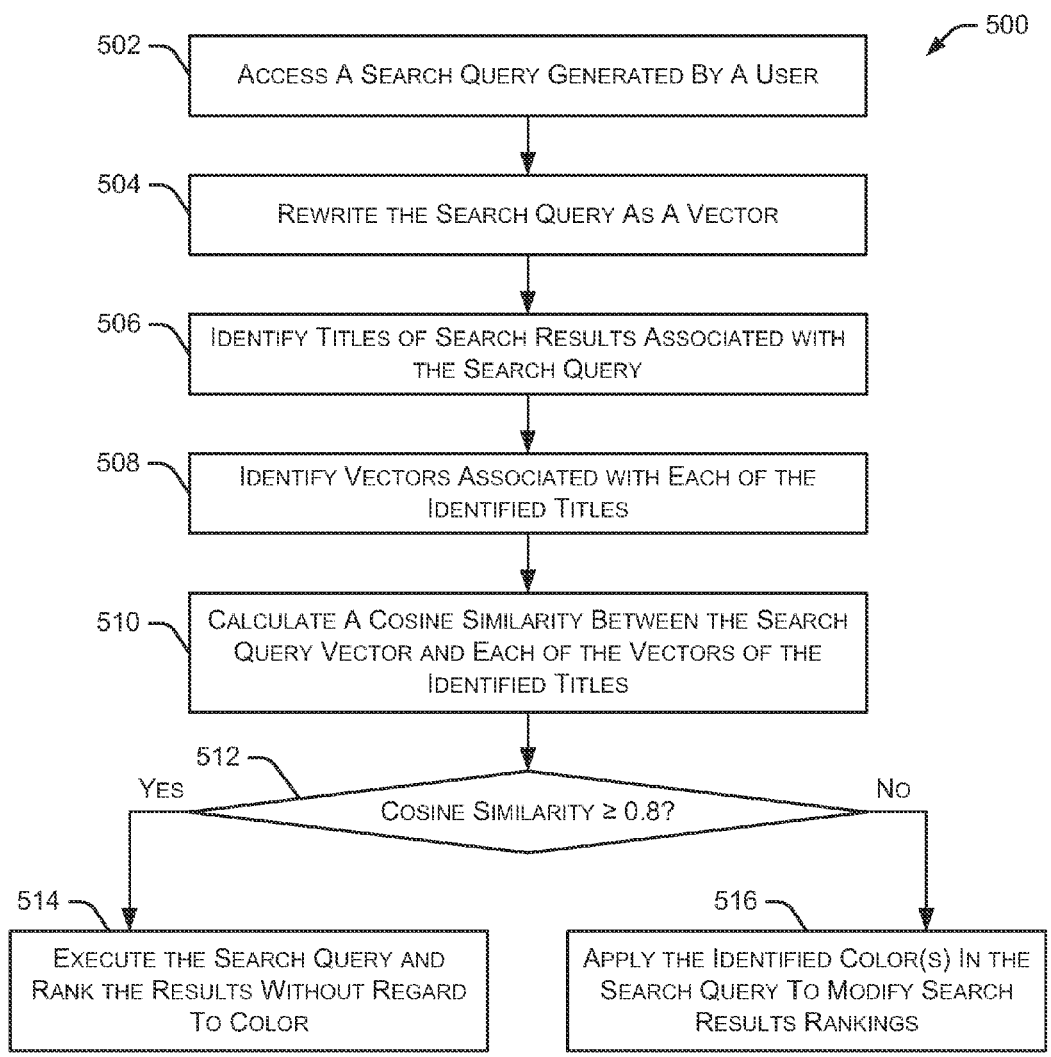
FIG. 5 is a flow diagram depicting an embodiment of a method for determining whether a user intended an actual color in a search query.

FIG. 5 is a flow diagram depicting an embodiment of a method 500 for determining whether a user intended an actual color in a search query. Initially, the method 500 accesses a search query generated by a user at 502 and rewrites the search query as a vector at 504. When rewriting the search query as a vector, each term in the search query is identified along with a number of occurrences of the term in the search query. For example, a search query "brown leather jacket" would have an associated vector [brown: 1, leather: 1, jacket: 1]. The method 500 continues by identifying titles of search results associated with the search query at 506. Additionally, the method 500 identifies vectors associated with each of the identified titles at 508. The vectors associated with the identified titles are written in the same format as the search query vector discussed above. In some embodiments, if a particular title does not have an associated vector, the method 500 creates a vector associated with the particular title. The method 500 calculates a cosine similarity between the search query vector and each of the vectors of the identified titles at 510. The cosine similarity determines a similarity between two vectors by measuring the cosine of the angle between the two vectors. The cosine of the angle between the two vectors provides an indication of whether the two vectors are pointing in similar directions.

The resulting value of the cosine similarity calculation mentioned above determines whether the user intended an actual color in the search query. In one embodiment, a cosine similarity of 0.8 is used as a threshold for determining whether the user intended an actual color in the search query. In this embodiment, if the cosine similarity is greater than or equal to 0.8 at 512, the method 500 presumes that the user did not intend an actual color in the search query. In this situation, the method 500 executes the search query and ranks the search results without regard to color at 514. However, if the cosine similarity is less than 0.8 at 512, the method 500 presumes that the user intended an actual color in the search query. In this situation, the method 500 applies the identified color (or colors) in the search query to modify the search results ranking at 516.

Figure 6:
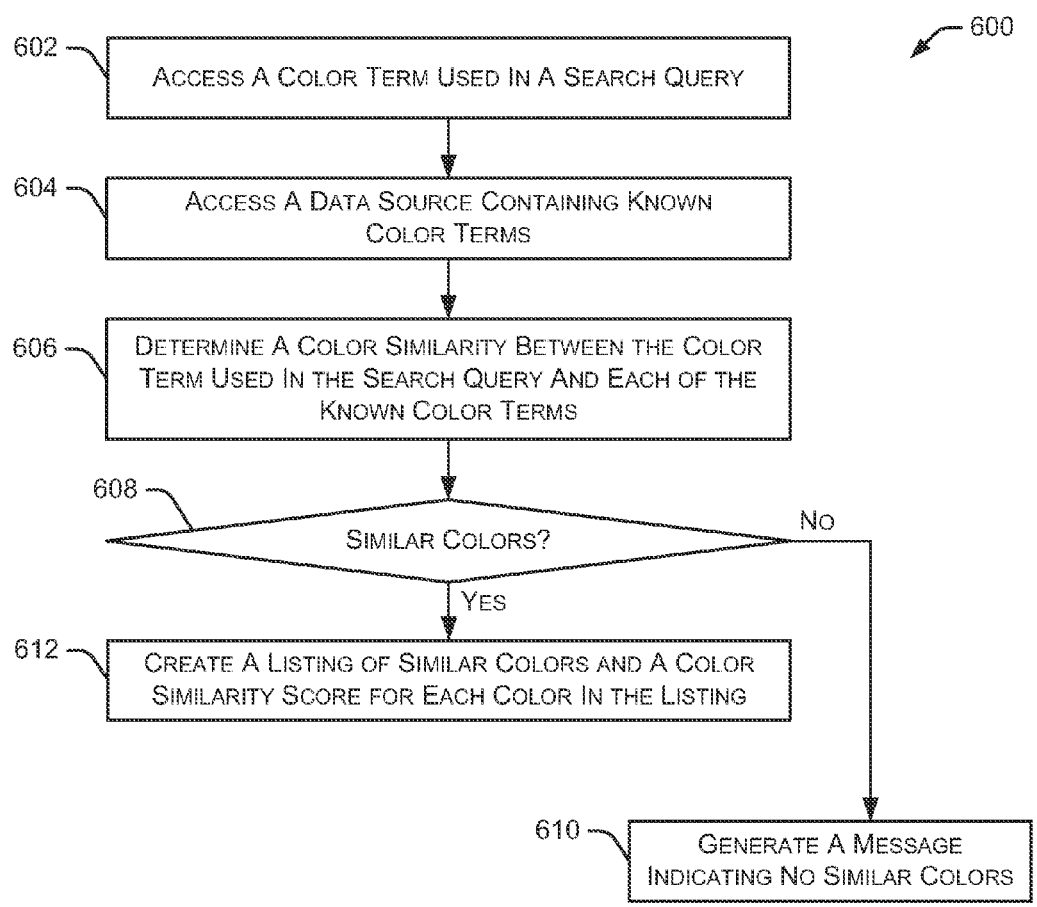
FIG. 6 is a flow diagram depicting an embodiment of a method for determining a similarity between two colors.

FIG. 6 is a flow diagram depicting an embodiment of a method 600 for determining a similarity between two colors. In some embodiments, the method 600 is performed by a color analysis service, such as color analysis service 116 (FIG. 1), or a color analysis module, such as color analysis module 212 (FIG. 2). Initially, the method 600 accesses a color term used in a search query at 602 and accesses a data source containing known color terms at 604. A color similarity is determined, at 606, between the color term used in the search query and each of the know color terms accessed from the data source. In some embodiments, a color similarity score is associated with each (color term—known color) pair that exhibits at least a minimal level of color similarity.

After determining a color similarity between the color term in the search query and each of the known color terms, the method 600 determines whether any pairs of colors are similar at 608. If none of the known color terms are similar to the color term in the search query, the method 600 generates a message indicating the lack of similar colors at 610. This message is communicated to a system or procedure that is handling the ranking of the search results. If, at 608, at least one of the known color terms are similar to the color term in the search query, the method 600 creates a listing of similar colors and a color similarity score for each color in the listing at 612. This listing is used by the system or procedure that is handling the ranking of the search results, as discussed herein.

In a particular example, a color term "red" is used in a search query. Several known colors are determined to have at least a minimal level of color similarity, such as "pink," "burgundy," and "maroon." In this example, a color similarity score is calculated for each of the (red-pink), (red-burgundy), and (red-maroon) pairs. The following table illustrates example color similarity scores for the three identified pairs. In this example, a lower similarity score represents a higher similarity between the two colors.

| Color Pair | Color Similarity Score |
| --- | --- |
| Red - Pink | 5 |
| Red - Burgundy | 12 |
| Red - Maroon | 9 |

In this example, the color pink has the highest similarity with the "red" color term in the search query. Thus, a product having a pink color is given a higher rank in the search results when compared to products having burgundy or maroon colors. Additionally, a product having a burgundy or maroon color is given a higher rank in the search results when compared to products having dissimilar colors, such as blue, green, silver, and yellow.

In a particular implementation, a color similarity score is calculated using a color difference formula published by the International Commission on Illumination (CIE), commonly referred to as CIE94. This formula determines a difference (or distance) between two colors.

Figure 7:
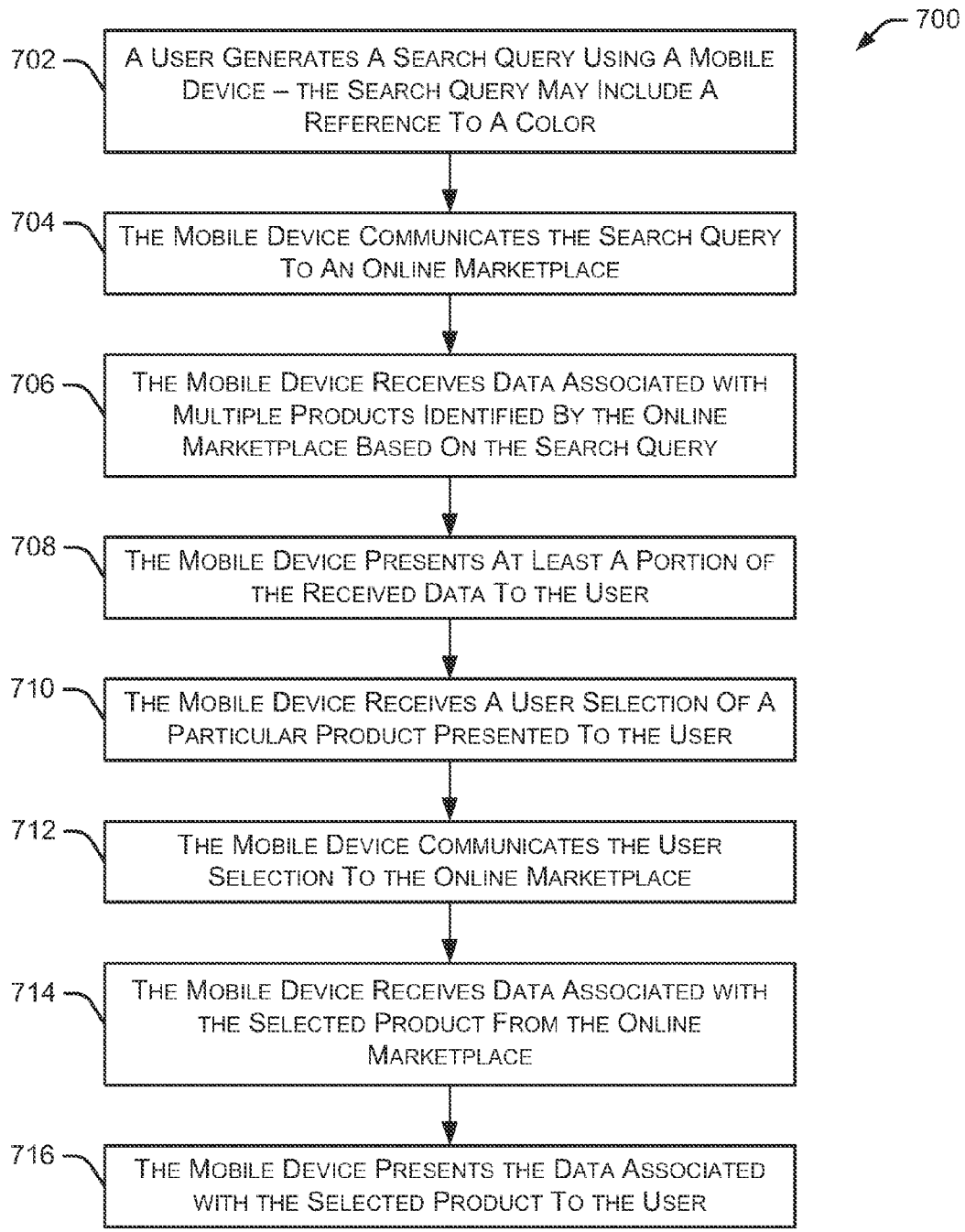
FIG. 7 is a flow diagram depicting an embodiment of a method for submitting a search query through a mobile device.

FIG. 7 is a flow diagram depicting an embodiment of a method 700 for submitting a search query through a mobile device. Initially, a user generates a search query using a mobile device at 702. In some situations, the search query includes a reference to a color. The mobile device communicates the search query to an online marketplace at 704. In alternate embodiments, the search query is communicated to any system or service that manages or executes search queries. The mobile device receives, at 706, data associated with multiple products identified by the online marketplace based on the search query. The mobile device presents at least a portion of the received data to the user at 708. A display screen associated with the mobile device may have limited space such that it can only display a portion of the received data at a particular time. In this situation, the mobile device may initially display the top-ranked results received from the online marketplace. The user can then scroll or otherwise select other results for display on the mobile device. As discussed herein, the top-ranked results received from the online marketplace are determined, at least in part, by the reference to the color in the user's search query.

The method 700 continues as the mobile device receives a user selection of a particular product presented to the user at 710. For example, the user may desire additional information regarding a particular product. The mobile device communicates the user selection to the online marketplace at 712 and receives data associated with the selected product from the online marketplace at 714. The mobile device presents the data associated with the selected product to the user at 716. The user may then request additional information about the product, request information related to a different product, place an order to purchase the product, generate a new search query, and the like.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   receiving a product search query from a user;
   identifying a reference to a stated color in the product search query by comparing each term in the product search query with a listing of known color terms, wherein the reference to the stated color in the product search query is a keyword in the product search query;
   determining one or more additional references of one or more additional colors associated with the stated color in the product search query based on one or more similarity scores each indicating a color distance of a color pair between an individual color of the one or more additional colors and the stated color in the product search query, the one or more similarity scores calculated using a color difference formula;
   executing the product search query to identify a plurality of products;
   identifying a plurality of references to the stated color contained in a title or a description of multiple of the plurality of products;
   calculating a cosine similarity between a search query vector and vectors of identified titles to determine whether the user intended an actual color in the product search query;
   creating, using one or more processors, a ranking of the plurality of products by increasing ranking of one or more particular products of the plurality of products that include the reference to the stated color in the title or the description of the one or more particular products and including in the ranking below the one or more particular products multiple similarly colored products of the plurality of products that include the one or more additional references of the one or more additional colors associated with the stated color in the product search query; and
   communicating the ranking of the plurality of products to a device operated by the user.

2. The method of claim 1, further comprising causing to display the ranking of the plurality of products to the user.

3. The method of claim 1, wherein the creating the ranking of the plurality of products comprises creating the ranking of the plurality of products without using the reference to the stated color in the product search query in response to a determination that the user did not intend the actual color.

4. The method of claim 1, wherein analyzing of the product search query to determine whether the user intended the actual color includes calculating the cosine similarity between the product search query and the title or the description of the multiple of the plurality of products.

5. A method comprising:
   receiving a product search query from a user;
   identifying a reference to a color in the product search query;
   creating an initial ranking of a plurality of products based on the product search query;
   analyzing the product search query to determine whether the user intended an actual color by the reference to the color in the product search query including calculating a cosine similarity between a search query vector and vectors of identified titles to determine whether the user intended the actual color in the product search query;
   responsive to determining that the user intended the actual color by the reference to the color in the product search query:
     determining one or more additional references of one or more additional colors associated with the actual color in the product search query based on one or more similarity scores each indicating a color distance of a color pair between an individual color of the one or more additional colors and the actual color in the product search query, the one or more similarity scores calculated using a color difference formula;
     identifying a plurality of references to the actual color contained in a title or a description of multiple of the plurality of products; and
     creating, using one or more processors, an ordered ranking of products of the plurality of products by increasing a ranking of the multiple of the plurality of products that include the reference to the actual color in the title or the description and including in the ordered ranking further products of the plurality of products having the one or more additional references of the one or more additional colors associated with the actual color in the product search query.

6. The method of claim 5, further comprising communicating the ordered ranking of the plurality of products to a device operated by the user.

7. The method of claim 5, further comprising causing to display the ordered ranking of the plurality of products to the user.

8. The method of claim 5, further comprising ranking the plurality of products without using the reference to the color in the product search query in response to a determination that the user did not intend an actual color.

9. The method of claim 5, wherein the analyzing of the product search query to determine whether the user intended the actual color includes calculating the cosine similarity between the product search query and the title or the description of the multiple of the plurality of products.

10. The method of claim 5, wherein the reference to the color in the product search query is a keyword in the product search query.

11. The method of claim 5, wherein the identifying the reference to the color in the product search query includes comparing each term in the product search query with a listing of known color terms.

12. An apparatus comprising:
a memory to store data associated with at least one product; and
one or more processors coupled to the memory, the one or more processors configured to:
receive a product search query from a user;
identify a reference to a color in the product search query;
analyze the product search query to determine whether the user intended an actual color including calculating a cosine similarity between a search query vector and vectors of identified titles to determine whether the user intended an actual color in the product search query;
at least when a determination has been made that the user intended an actual color, determine one or more additional references of one or more additional colors based on one or more similarity scores each indicating a color distance of a color pair between an individual color of the one or more additional colors and the color in the product search query, the one or more similarity scores calculated using a color difference formula;
execute the product search query to identify a plurality of products;
at least when a determination has been made that the user intended an actual color, identify in a description of multiple of the plurality of products one or more references to the color in the product search query;
at least when a determination has been made that the user intended an actual color, create a ranking of the plurality of products by comparing the one or more references to the color in the description of the multiple of the plurality of products to the reference to the color in the product search query and to the one or more additional references of the one or more additional colors; and
at least when a determination has been made that the user did not intend an actual color, create the ranking of the plurality of products without using the reference to the color in the product search query.

13. The apparatus of claim 12, wherein the one or more processors are further configured to communicate the ranking of the plurality of products to a device operated by the user.

14. The apparatus of claim 12, wherein the one or more processors are further configured to identify the reference to the color in the product search query by comparing each term in the product search query with a listing of known color terms.

15. The apparatus of claim 12, wherein a value of 0.8 for the cosine similarity is used as a threshold for determining whether the user intended an actual color in the product search query.

* * * * *